United States Patent

Standing

[15] 3,675,138

[45] July 4, 1972

[54] REDUCTION OF INTERMODULATION PRODUCTS

[72] Inventor: Arthur F. Standing, Rockville, Md.

[73] Assignee: Communications Satellite Corporation

[22] Filed: Sept. 23, 1970

[21] Appl. No.: 74,567

[52] U.S. Cl. ..............................328/163, 328/155, 330/149, 333/20

[51] Int. Cl. ..........................................................H03b 1/00

[58] Field of Search....................328/162, 155, 142, 13, 163; 307/229; 330/43, 124, 149; 333/20; 325/50, 473

[56] References Cited

UNITED STATES PATENTS 2,999,986 9/1961 Holbrook..............................330/149
3,299,362 1/1967 Sanberg............................328/142 X
3,548,323 12/1970 Gordon.................................328/142
3,235,809 2/1966 Alsberg et al.........................330/124 X
3,460,051 8/1969 Bray..................................330/149 X

*Primary Examiner*—Stanley T. Krawczewicz
*Attorney*—Allan J. Kasper and Martin C. Fliesler

[57] ABSTRACT

Apparatus for reducing the intermodulation products in active devices such as klystrons, traveling wave tubes and limiters is disclosed. A feedforward control amplitude predistorter which has a characteristic inverse to that of the active device predistorts the amplitude of the input signal to the active device so as to effectively linearize it. A feedforward control phase compensator predistorts the phase of the input signal to the active device so as to compensate for the differential signal phase shift through the active device due to a change in signal input power.

32 Claims, 11 Drawing Figures

AMPLITUDE PREDISTORTER

ATTENUATION CHARACTERISTIC OF DIODE ATTENUATOR

PHASE COMPENSATOR

TYPICAL AMPLITUDE CHARACTERISTIC

TYPICAL PHASE CHARACTERISTIC

LIMITER

REDUCTION OF INTERMODULATION PRODUCTS

BACKGROUND OF THE PRIOR ART

Wideband transmission circuits are frequently used for simultaneously transmitting information over a plurality of different frequency channels. Active devices used in these wideband transmission circuits, such as traveling wave tubes klystrons, exhibit (1) nonlinear amplitude and (2) phase phenomena which independently cause distortion, i.e. intermodulation products, thereby contributing unwanted noise in the system. The first form of distortion is due to the non-linear power input/output characteristics of the amplifier as it approaches saturation. The second form of distortion is due to the variation of phase shift of the signal through the amplifier as the input power is changed.

Though an amplifier will mix frequencies of a multi-carrier system and hence cause intermodulation products when the signal levels are sufficient to drive the amplifier into its non-linear region, less distortion will occur when the amplifier is operating in its linear region, i.e., at signal levels well below the saturation level of the amplifier. Therefore, to reduce the generation of unwanted intermodulation products, in normal practice amplifiers used for multicarrier operation are "-backed-off," that is, operated within the linear region. With respect to limiters, distortion will also occur when limiters are operating in their non-linear region. However, it is not sufficient to "back-off" a limiter for then the function of the device would be destroyed since it would not be acting as a limiter.

The need to "back-off" amplifiers in order to simultaneously transmit information over a plurality of carriers has several disadvantages. First, to obtain desired signal amplification with a minimization of distortion, there is required the use of higher power amplifiers than ordinarily needed to allow "-backing-off"; consequently, by not operating the amplifier to its fullest capacity a loss in power efficiency must be accepted. Secondly, the operation of a high power amplifier requires the use of higher cost equipment, e.g. larger cooling means to adequately cool the higher power amplifier, as well as the higher cost of the amplifier itself. Thirdly, though "backing-off" will reduce intermodulation products due to non-linear amplitude characteristics, phase variations of the signals will continue as the signals travel through the amplifier thereby producing intermodulation products, Also, since most serious phase variations occur at low drive levels and diminish as the level approaches saturation intermodulation products from phase distortion will contribute significantly to the total distortion at low drive levels, thus setting a bound to the improvement achievable by input level back-off.

Though the previous discussion has been directed towards multi-carrier transmission systems, any system that requires the transmission of amplitude variations also will require "-backing-off," thereby reducing amplifier efficiency.

SUMMARY OF THE INVENTION

In accordance with this invention two feedforward predistortion circuits placed in series and anterior to a non-linear high power amplifier are used to enable operation of the amplifier in the non-linear region while reducing intermodulation products. The first circuit is an active signal amplitude predistorter which is capable of providing a power input/output characteristic inverse to the characteristic of the amplifier so as to effectively linearize it. The second circuit is an active signal phase compensator which compensates for differential phase changes through the amplifier due to the signal amplitude changes at the input of the amplifier so that the phase of the output signal from the amplifier is unchanged in its relationship to the phase of the signal to the input of the compensator. That is, the instantaneous power level of a multicarrier input, as it travels through the phase compensator of the present invention and the high power amplifier, must maintain a constant phase differential between the input to the phase compensator and the output of the high power amplifier irrespective of the instantaneous power input to the phase compensator. Predistortion of the input signal to the amplifier in amplitude and phase is accomplished with the use of a number of non-linear elements whose characteristics are controlled in the correct time relationship by the instantaneous input power to the predistortion circuits. In the alternative each circuit may be independently used to reduce distortion due to either non-linear amplitude or phase variations.

With respect to the first predistortion circuit mentioned above which has a power input/output characteristic inverse to that of the high power amplifier with which it is associated, the input signal to the predistortion circuit is power divided and fed to two diode attenuators, respectively. A diode attenuator exhibits a response which is a function of its coupling coefficient k which in turn is a function of the control current to the diode. The coefficient $k$ can be approximated by an exponential function of the control current. The control current of one diode attenuator is kept at a fixed bias thereby keeping $k$ constant and providing an output which is linear. The control current of the second diode attenuator is not fixed but is controlled by the input power to the predistortion circuit via a feedforward control circuit, thereby making the coupling coefficient variable in accordance with the input power to the predistortion circuit. The response of this diode attenuator will therefore be exponential with the selection of correct biasing and control currents, the outputs from both diode attenuators are added to provide a signal having a response which is the inverse of the characteristic of the high power amplifier which is driven by the output of the predistortion circuit, thereby effectively linearizing the power input/output characteristics of the high power amplifier.

The second predistortion circuit or phase compensator is different in detail from the amplitude predistortion circuit, however, the feedforward control circuit is essentially the same. The input signal of the phase compensator is fed to a hybrid which divides the signal into two signals of equal power having a 90° phase difference between them. These signals are then fed, respectively, to two hybrids where they undergo further power divisions and phase changes. Three of four outputs of the latter two hybrids are then fed, respectively, to three diode attenuators which differentially alter the amplitudes of the signals. Two of the signals are linearly attenuated while the third signal is exponentially attenuated. A linearly attenuated signal and the exponentially attenuated signal which are in the proper phase relationship are then combined and added to the other linearly attenuated signal to produce a resultant signal. Due to a phase difference between the combined signal and the other linearly attenuated signal and due to a differential change in amplitude between the combined signal and the other linearly attenuated signal the resultant signal will have undergone a phase change in relation to the input signal of the phase compensator. The phase change is determined in accordance with the differential phase shift produced by the high power amplifier as the instantaneous input power to the amplifier changes so as to compensate for such phase shift. Phase compensation is achieved by selection of proper bias and control currents.

DETAILED DESCRIPTION OF THE PREFERRED EMBODIMENT

Figure 3:
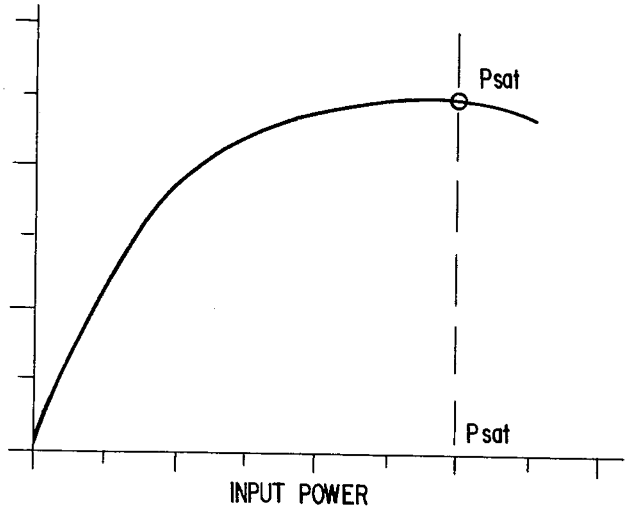
FIG. 3 is a graph of a typical power characteristic for a traveling wave tube.

Referring initially to FIG. 3 there is shown a graph of a typical power characteristic of a traveling wave tube showing the output power as a function of the input power and also showing the saturation point of the tube. From this graph it is qualitatively apparent that in order to avoid amplitude distortion, the tube must be operated considerably below its saturation level, i.e., in its linear region. However, if an error curve can be generated from the difference between the actual tube characteristic (FIG. 3) and that of a perfectly linear one, that is a curve which is the inverse of the curve of FIG. 3, then a combination of the curve of FIG. 3 and its inverse will result in linearization of the tube, thereby enabling operation of the amplifier as a linear device through saturation. The amplitude predistorter of the present invention, hereinafter more fully described, is a device which will produce the inverse characteristic of the amplifier it is driving.

Figure 8:
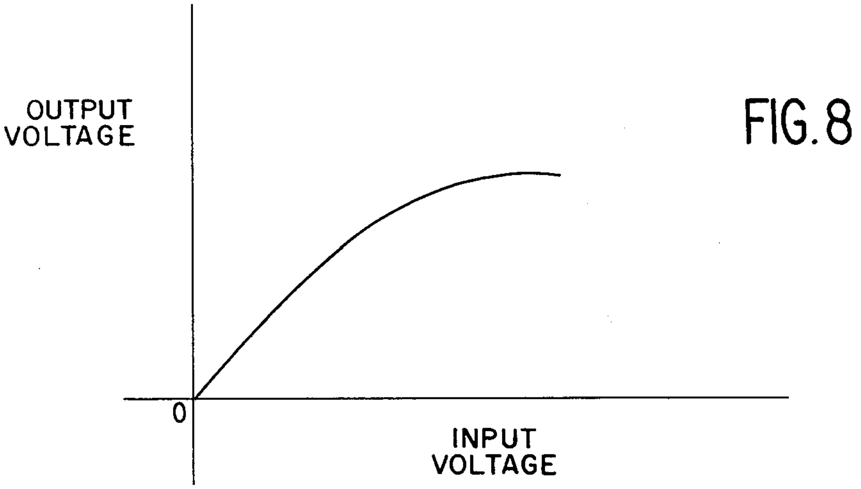
FIG. 8 is a graph of a signal at a certain point in the apparatus of FIG. 2.

In the discussion to follow reference will be made to devices known as (1) diode attenuators (2) variable attenuators, (3) crystal detectors (4) clamps (5) limiters and (6) hybrids. Examples of such devices which may be used in the present invention are disclosed in the following publications:

1. Diode Attenuator — "Microwave Semi-conductor Devices and Their Circuit Applications," edited by H. A. Watson — McGraw-Hill, Copyright 1969, Chapter 10, Section 10.4, FIG. 10.22.
2. Variable Attenuators — "Original Designs in IF, RF and Microwave Components" — Merrimac Research and Development, Inc., West Caldwell, N. J., Copyright 1969, Section 7, page 7–15.
3. Crystal Detector (i.e. Tunnel Diode Detector) — "MicroWaves," May 1968 — Aertech Corporation, Sunnyvale, Calif.
4. Clamps — "Pulse, Digital, and Switching Waveforms" by Millman and Taub, Copyright 1965, McGraw-Hill, Chapter 8, FIG. 8–10.
5. Limiters — "Microwave Semi-conductive Devices and Their Circuit Applications"— edited by H. A. Watson — McGraw-Hill, Copyright 1969, Chapter 10, Section 10.8, FIG. 10.18.
6. Hybrids — "Precision Microwave and Test Equipment" — by the Narda Microwave Corporation, Kensington, Md., Copyright 1967, Catalog No. 15, Section 6.

Figure 1:
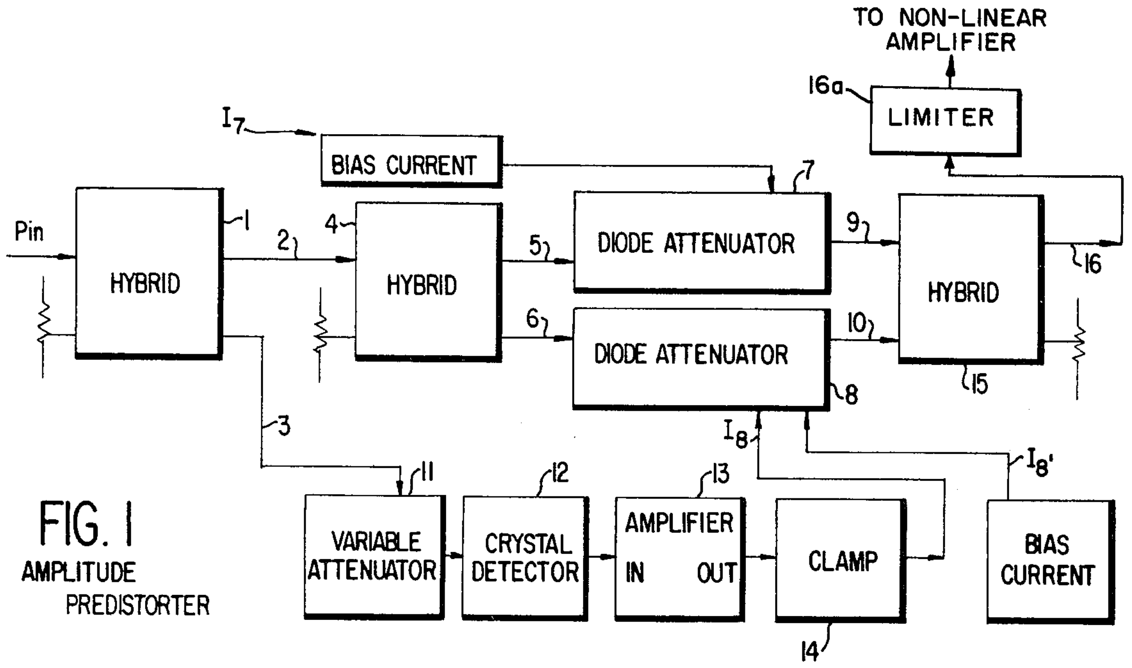
FIG. 1 is a block diagram of the amplitude predistorter of the present invention.

Referring to FIG. 1 input signals with power $P_{in}$ are fed to hybrid 1. The function of hybrid 1, as is well known in the art, is to divide the power of each input signal in half and to provide outputs $P_{in}/2$, respectively, on lines 2 and 3. The hybrid also produces a differential phase change in the output signals, however, this phase change need not be considered for purposes of amplitude predistortion. One output $P_{in}/2$, of hybrid 1 is then fed, via line 2, to hybrid 4 which performs the same function as hybrid 1. Hybrid 4 again divides its input power in half and provides two output signal of power $P_{in}/4$, respectively. Each output $P_{in}/4$ is then fed, via lines 5 and 6, respectively, to diode attenuators 7 and 8.

Diode attenuators 7 and 8 have attenuation characteristics which are a function of their respective coupling coefficients $k_7$ and $k_8$. The coupling coefficient $k_7$ of diode attenuator 7 is a function of its bias current $I_7$ which is fixed and therefore the coupling coefficient remains a constant $k_7$. The output of the diode attenuator 7 on line 9 is therefore equal to $(k_7)\ P_{in}/4$ and is linear, as can be seen from FIG. 7A.

Figure 6:
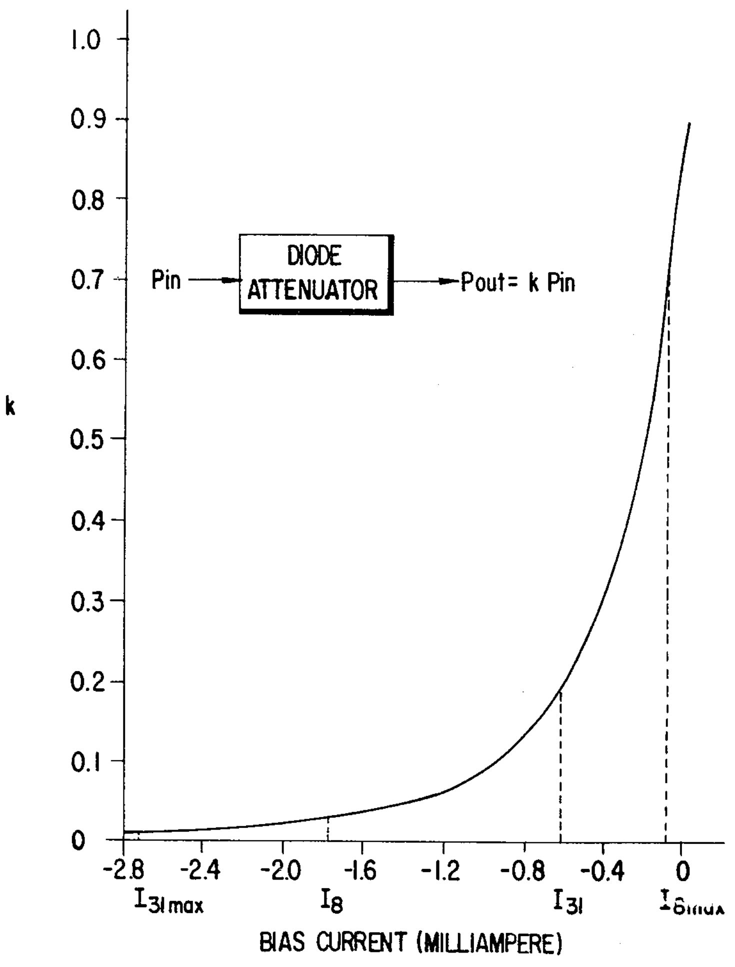
FIG. 6 is a graph of the attenuation characteristic of a diode attenuator with a variable control current.
Figure 7A:
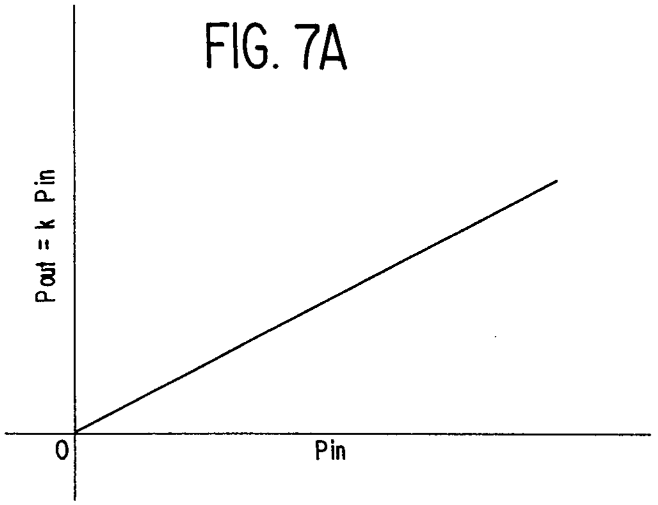
FIGS. 7A and 7B are graphs of the response of diode attenuators at certain points within the apparatus of FIGS. 1 and 2.
Figure 7B:
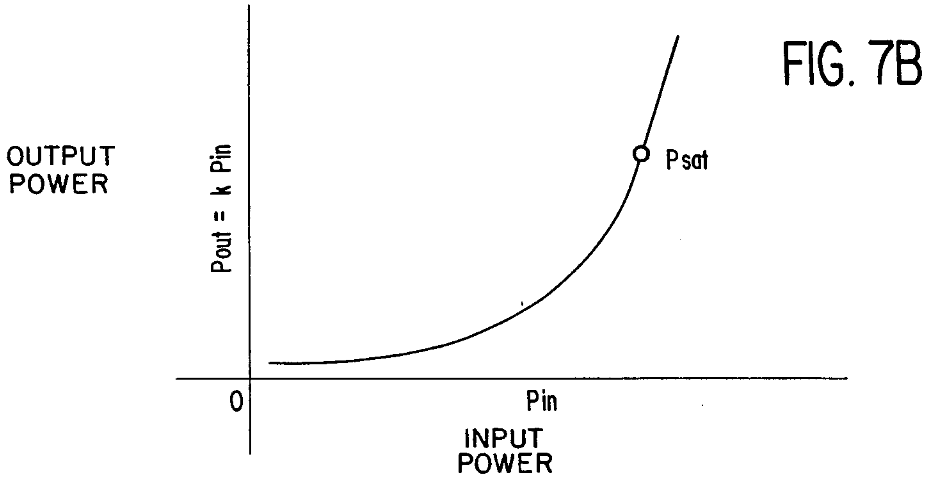

Diode attenuator 8 has a coupling coefficient $k_8$ which is a function of variable control current $I_8$ which is made proportional to the input power $P_{in}$ to the predistorter. The attenuation characteristic of diode attenuator 8 is, therefore, also proportional to the instantaneous power $P_{in}$ as will hereinafter be discussed. The attenuation characteristic of a diode attenuator controlled by a current proportional to its instantaneous input power has a shape which can be approximated by an exponential as can be seen from FIG. 6. The response on line 10, therefore, of diode attenuator 8 is equal to $(k_8P_{in})/4$ and is exponential, as is illustrated in FIG. 7B.

In order to vary control current $I_8$ in linear proportion to the instantaneous input power $P_{in}$ a feedforward control circuit is used. Output $P_{in}/2$ from hybrid 1 on line 3 is fed to variable attenuator 11 or any other gain adjusting device. Variable attenuator 11 is present for each high power amplifier and has an output linearly proportional to the input power $P_{in}/2$ and which is at the desired level for properly driving crystal detector 12 within its square low range. The output of crystal detector 12 which is a voltage linearly proportional to output $P_{in}/2$ is then fed to amplifier 13 which generates an output current $I_8$ linearly proportional to its input from crystal detector 12 and therefore linearly proportional to the instantaneous input power $P_{in}/2$ on line 3. Fixed bias current $I'_8$ is the initial control current used to obtain initially a value for variable coupling coefficient $k_8$ as can be seen from FIG. 6.

A clamp 14 is placed at the output of amplifier 13 in order to fix the control current $I_8$ at a maximum. The maximum $I_{8MAX}$ is set at the point at which the power to the diode attenuator 8 is at the saturation point of the high power amplifier; this is done so that above saturation the diode attenuator 8 has a linear response as illustrated in the linear portion of FIG. 7B for reasons hereinafter discussed.

The outputs of the diode attenuators $(k_7)\ P_{in}/4$ and $(k_8)\ P_{in}/4$ on lines 9 and 10, respectively, are then fed to hybrid 15. Hybrid 15 adds these outputs to provide an output $(k_7)(P_{in})/(4) + (k_8)(P_{in})/(4)$ on line 16. As will be apparent from FIGS. 7A and 7B the latter output signal will have a response which is the inverse of the amplitude characteristic of the high power amplifier of FIG. 3 up to saturation and which is linear above saturation. The amplitude predistorted output signal on line 16 is then coupled to drive a high power amplifier which is now effectively linearized and therefore need not be "backed-off." Thus, the high power amplifier may be operated at saturation with a large reduction in intermodulation products.

Figure 5:
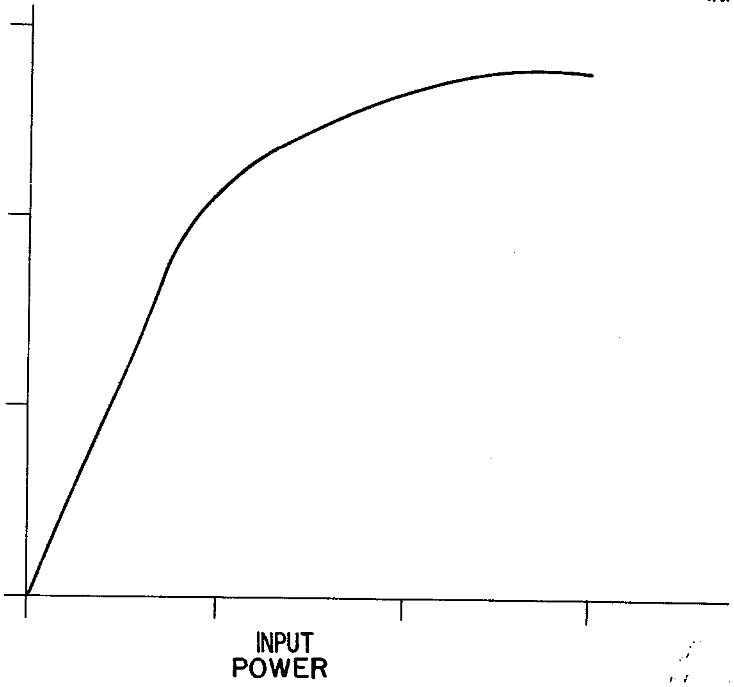
FIG. 5 is a graph of a typical transfer characteristic for a limiter.

The above discussion has related to linearization of a high power amplifier up to saturation in order to reduce intermodulation products. Above saturation the output of the signal is compressed; see FIG. 3. Compression of the signal above saturation also results in the production of unwanted intermodulation products. It has been shown that if the region of the curve of FIG. 3 above saturation is made flat, that is, if above the power input for saturation the output remains constant, then intermodulation products may be reduced. As noted previously, the amplitude predistorter of FIG. 1 is arranged to be linear above saturation, i.e., at $I_8$ maximum. In order to make the region above saturation flatter, the linear region of FIG. 7B must also be flat so that as the signal travels through the high power amplifier the effect is to flatten out the region above saturation. To do this a limiter is placed between the amplitude predistortion device of FIG. 1 and the high power amplifier. The limiter has the effect of flattening the linear portion of FIG. 7B. The limiter flattens the linear region of FIG. 7B by allowing signal powers to pass but only up to a maximum. It should also be noted, as illustrated in FIG. 5, that a limiter is itself a non-linear device and, therefore, to reduce unwanted intermodulation products from being generated another amplitude predistorter of the type shown in FIG. 1 may be placed anterior to the limiter. This amplitude predistorter would be properly designed to produce a characteristic inverse to that of the limiter.

The availability of an amplitude predistorter to linearize a limiter has another advantage. In a communications system employing FM modulation, the output carrier deviation of the FM modulator is a function of the voltage into the FM modulator. In a multichannel system the output carrier deviation or bandwidths of two adjacent channels may at times be large enough to cause overlapping or crosstalk. At the receiver, filters will filter each channel and will avoid some overlapping but it is difficult to design filters which would effectively cut off all crosstalk.

Instead of requiring the use of these difficult to design filters at the receivers, a limiter and an amplitude predistorter of the present invention may be placed anterior to each FM modulator to limit the voltage to the modulator. This would limit the output deviation or bandwidth of each FM modulator, thereby effectively reducing crosstalk and avoiding the need for the above type of filters. Without the use of the amplitude predistorter of the present invention it is not feasible to use a limiter due to its nonlinear characteristics.

Also, there should be placed, anterior to the high power amplifier, a scale amplifier. The function of the scale amplifier is to scale the signal power output of the amplitude predistorter to a level necessary to drive the high power amplifier. The scale amplifier is also non-linear and though "backing-off" this device would not result in disadvantages acquired when "-backing-off" a high power amplifier (due to the low initial and operating costs of a scale amplifier) the scale amplifier may be preceded by still another amplitude predistorter of the type shown in FIG. 1 to linearize it.

Referring again to FIG. 1, though hybrid 1 is shown coupling respective outputs $P_{in}/2$ and $P_{in}/2$ to lines 2 and 3 any coupler may be satisfactorally used to couple input $P_{in}$ to lines 2 and 3. Also, since diode attenuator 7 merely linearly couples the output of hybrid 4 to the input of hybrid 15, any linear attenuator may be substituted for it. However, if diode attenuator 7 is not actually used then the electrical length between hybrids 4 and 5 should be the same as that with diode attenuator 8 interposed therebetween. Equal electrical lengths are required in order to avoid destructive interference between the two inputs $(k_7)\ P_{in}/4$ and $(k_8)\ P_{in}/4$ which are summed in hybrid 15.

Figure 4:
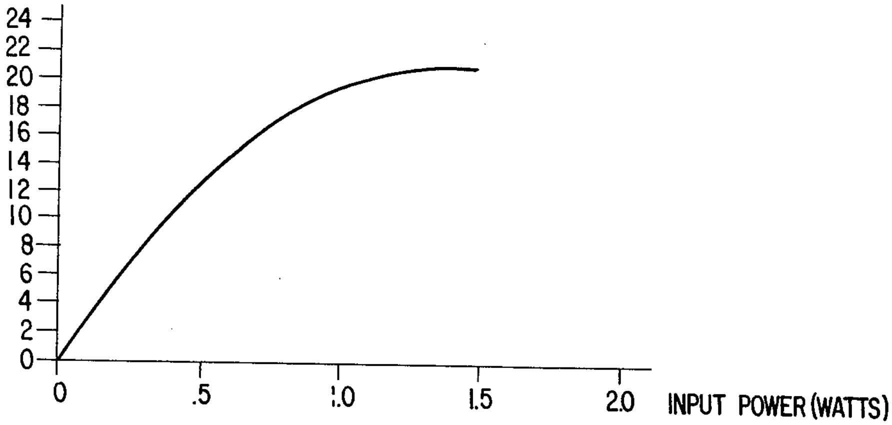
FIG. 4 is a graph of a typical phase characteristic of a traveling wave tube.

FIG. 4 is a graph of a typical phase characteristic of a traveling wave tube showing differential phase shift as a function of input power. From this graph, it can be seen that if the phase of the input signal to the tube is predistorted so as to compensate for the differential phase shift through the tube then intermodulation products may be reduced. That is, if due to an input signal power change there is a differential phase shift of −6° (lag) as the signal travels through the tube, e.g. from −20° to =26°, then if the input signal can be predistorted by giving it a differential phase shift of +6° (lead) prior to entering the tube, this will result in a signal whose output phase from the tube is in the same relationship to the phase of the input signal to the predistorter, thereby effectively compensating for a differential phase shift through the tube.

Figure 2:
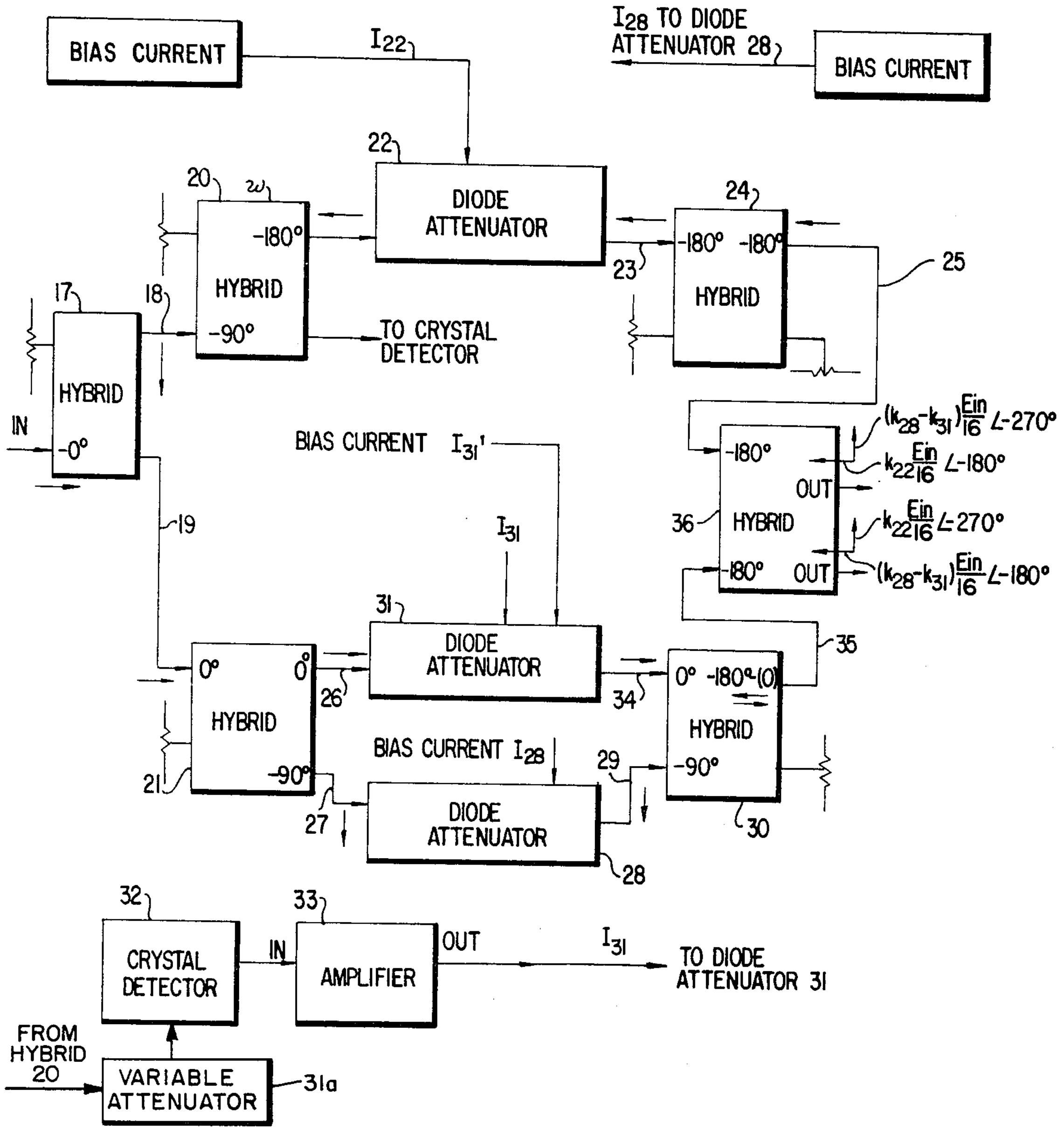
FIG. 2 is a block diagram of the phase compensator of the present invention.

Referring to FIG. 2 there is shown a block diagram of the phase compensator with phasors shown at various points in the circuit which will facilitate an understanding of this circuit. In discussing this circuit the assumption is made that (1) the phase shift through the hybrid is 0° and gives outputs of 0° and 90°, respectively, at its two output ports, and (2) all powers into the diode attenuators are equal.

An input signal with power $P_{in}$ is fed to hybrid 17 with a phase of 0°. Actually the input phase is merely a reference phase and may take on any initial value but for purposes of discussion it is assumed the initial input phase of the signal is 0°. Also, for convenience in description it is assumed the impedance through the circuit is constant so that $P_{in} \sim E_{in}$ (voltage) and the discussion may continue in terms of voltage and phasors. Hybrid 17 divides input signal $E_{in}$ in half and provides two outputs $E_{in}/2$, respectively, on lines 18 and 19. The output on line 18 will have undergone a −90° phase shift due to the differential phase shift in the hybrid as can be seen by the phasor at that point whereas the output $E_{in}/2$ through the hybrid on line 19 will remain at 0° as illustrated by the phasor at line 19. Output $E_{in}/2\ \angle{-90^\circ}$ on line 18 is then fed to hybrid 20 and output $E_{in}/2\ \angle{0^\circ}$ is fed to hybrid 21. Hybrid 20 then divides input $E_{in}/2\ \angle{-90^\circ}$ in half to provide two outputs at $E_{in}/4\ \angle{-180^\circ}$ and $E_{in}/4\ \angle{-90^\circ}$, respectively. Output $E_{in}/4\ \angle{-90^\circ}$ is then used to provide control current in a forward feed circuit to be hereinafter described. Output $E_{in}/4\ \angle{-180^\circ}$ is fed to diode attenuator 22 whose output $(k_{22}E_{in})/4\ \angle{-180^\circ}$ is then fed, via line 23 to hybrid 24. Hybrid 24 provides an output signal of $(k_{22}E_{in})/8\ \angle{-180^\circ}$ on line 25.

Referring again to output $E_{in}/2\ \angle{0^\circ}$ on line 19 it is fed to hybrid 21 which produces two outputs $E_{in}/4\ \angle{0^\circ}$ and $E_{in}/4\ \angle{-90^\circ}$ on lines 26 and 27, respectively. Output $E_{in}/4\ \angle{-90^\circ}$ is fed to diode attenuator 28 whose characteristic is linear as determined by a constant coupling coefficient $k_{28}$ which is a function of fixed bias current $I_{28}$. The input/output characteristic of diode attenuator 28 is also shown by FIG. 7A. The output on line 29 from diode attenuator 28 will then be equal to $(k_{28}E_{in})/4\ \angle{-90^\circ}$ and is fed to hybrid 30.

Output $E_{in}/4\ \angle{0^\circ}$ on line 26 is fed to diode attenuator 31. Diode attenuator 31 has a characteristic which is exponential due to a coupling coefficient $k_{31}$ which is a function of its control current $I_{31}$. Control current $I_{31}$ is not fixed but is proportional to instantaneous input power. Output $E_{in}/4\ \angle{-90^\circ}$ from hybrid 20 is used as the input power for providing control current $I_{31}$. Output $E_{in}/4\ \angle{-90^\circ}$ from hybrid 20 is fed to variable attenuator 31*a* or any other gain adjusting device and then to crystal detector 32 which provides an output voltage proportional to the instantaneous power of $E_{in}/4\ \angle{-90^\circ}$. This voltage is then fed to amplifier 33 which produces control current $I_{31}$ in response to its input voltage. Control current $I_{31}$ is then fed to diode attenuator 31 to vary coupling coefficient $k_{31}$ thereby giving diode attenuator 31 an exponential characteristic up to saturation in accordance with the graph shown in FIG. 7B. The variable attenuator 31*a*, crystal detector 32 and amplifier 33 operate in a manner similar to the feedforward control circuit of the amplitude predistorter to provide a control current which is linearly proportional to input power. Initial fixed bias current $I_{31}$ is the initial control current used to obtain initially a value for variable coupling coefficient $k_{31}$ as illustrated by FIG. 6. The maximum control current $I_{31MAX}$ is set by setting the gain in variable attenuator 31 (*a*) until the phase change compensates completely for the tube at saturation. The output $E_{in}/4\ \angle{-90^\circ}$ from hybrid 20 variable attenuator 31 (*a*), crystal detector 32 and amplifier 33 comprise the feedforward control circuit. The output of diode attenuator 31 will therefore be $(k_{31}E_{in})/4\ \angle{0^\circ}$.

Output $(k_{31}E_{in})/4\ \angle{0^\circ}$ on line 34 is fed through hybrid 30. Output $(k_{28}E_{in})/4\ \angle{-90^\circ}$ on line 29 undergoes a −90° phase shift to $(k_{28}E_{in})/8\ \angle{-180^\circ}$ and appears at the upper output of hybrid 30 with output $(k_{31}E_{in})/8\ \angle{0^\circ}$. At this output hybrid 30 performs a subtraction process on the two signals. Because the output $(k_{28}E_{in})/8\ \angle{-180^\circ}$ will be larger than output $(k_{31}E_{in})/8\ \angle{0^\circ}$ due to the linearity of diode attenuator 28, the output of hybrid 30 on line 35 will appear as in the graph of FIG. 8 and will be equal to $(k_{28}-k_{31})E_{in}/(8)\ \angle{-180^\circ}$.

Output $(k_{28}-k_{31})\ (E_{in})/(8)\ \angle{-180^\circ}$ on line 35 is fed as one input to hybrid 36. Output $(k_{22}E_{in})/8\ \angle{-180^\circ}$ on line 25 is fed as the other input to hybrid 36. Output $(k_{28}-k_{31})\ (E_{in})/(8)\ \angle{-180^\circ}$ appears at the upper right output of hybrid 36 as $(k_{28}-k_{31})\ (E_{in})/(16)\ \angle{-270^\circ}$. Output $(k_{22})\ E_{in}/8\ \angle{-180^\circ}$ is fed through hybrid 36 and appears at the upper right output as $(k_{22})\ E_{in}/16\ \angle{-180^\circ}$. At this output the resultant signal of the two signals will have a phase lead with increasing $P_{in}$ as compared to the input signal $P_{in}$ to hybrid 17. This is due to the differential amplitude change due to increasing $P_{in}$ between the output $(k_{22})\ E_{in}/16\ \angle{-180^\circ}$ and $(k_{28}-k_{31})\ E_{in}/16\ \angle{-270^\circ}$ with the former being larger.

At the lower output of hybrid 36 output $(k_{22})\ E_{in}/8\ \angle{-180^\circ}$ from line 25 will be at $(k_{22})\ E_{in}/16\ \angle{-270^\circ}$ and output $(k_{28}-k_{31})(E_{in})/(8)\ \angle{-180^\circ}$ from line 35 will be at $(k_{28}-k_{31})\ (E_{in})/(16)\ \angle{-180^\circ}$. The resultant of these signals will be a signal whose phase change is in phase lag with respect to the input $P_{in}$ to hybrid 17. Though the amplitude of the resultant signal will be different from the original input signal this difference will not substantially alter the effect of the phase compensator.

A signal traveling through a traveling wave tube will undergo a phase lag. Therefore, in order to compensate for this phase lag through the tube the output of hybrid 36 providing a phase lead is the output connected to the tube. Selection of the proper biasing and control currents will result in an output with a phase lead sufficient to compensate for the differential phase lag this signal will undergo due to variable input power. In this manner, the output signal of the traveling wave tube will be in the same phase relationship with respect to the input $P_{in}$ to the phase compensator irrespective of the instantaneous power of input $P_{in}$ and result in a reduction of the intermodulation products.

As with the linear diode attenuator 7 of the amplitude predistorter, since diode attenuators 22 and 28 are linear, they are not essential for the operation of the phase compensator and any linear attenuator may be employed. However, if diode attenuators 22 and 28 are not used then it is necessary to maintain the same electrical length between hybrids 20 and 24 and hybrids 21 and 30, respectively in order to avoid destructive interference.

Again, a scale amplifier should also be connected between the phase lead output of the phase compensator and high power tube which will be driven by the signal from such output in order to adequately drive the high power tube.

Proper predistortion of the input signal to the TWT, or other device, in both amplitude and phase predistortion is accomplished in two stages. First, knowing the shape of the transfer characteristics of, for example, a TWT, the required shape of the predistorted signal is achieved by the selection of the correct bias and control currents with the latter being obtained with feedforward control circuit. Secondly, once the desired shape of the predistorted signal is obtained then its amplitude is adjusted to the required output by means of the scale amplifier in order to properly drive the TWT. Since the amplitude transfer characteristics of most TWT's differ in absolute magnitude but are similar in shape it is possible to adjust the predistorted signal for amplitude predistortion of these TWT's by merely adjusting only the gain of the scale amplifier. However, the phase transfer characteristics of different TWT's will vary in shape and therefore appropriate adjustments to bias and control currents as well as to scale amplifier would be needed for proper phase compensation.

The output power of a TWT as well as the differential phase change through the tube is a function of frequency. Therefore, in order to operate the amplitude predistorter and phase compensator of the present invention over a broad band both an amplitude equalizer and group delay equalizer, devices well known in the are, may be utilized. The amplitude equalizer is connected between the amplitude predistorter of the present invention and the TWT in order to insure that the TWT gain is constant through the operating band. The group delay equalizer is connected between the phase compensator of the present invention and the TWT in order to insure that the phase transfer characteristic is identical through the operating band.

Figure 9A:
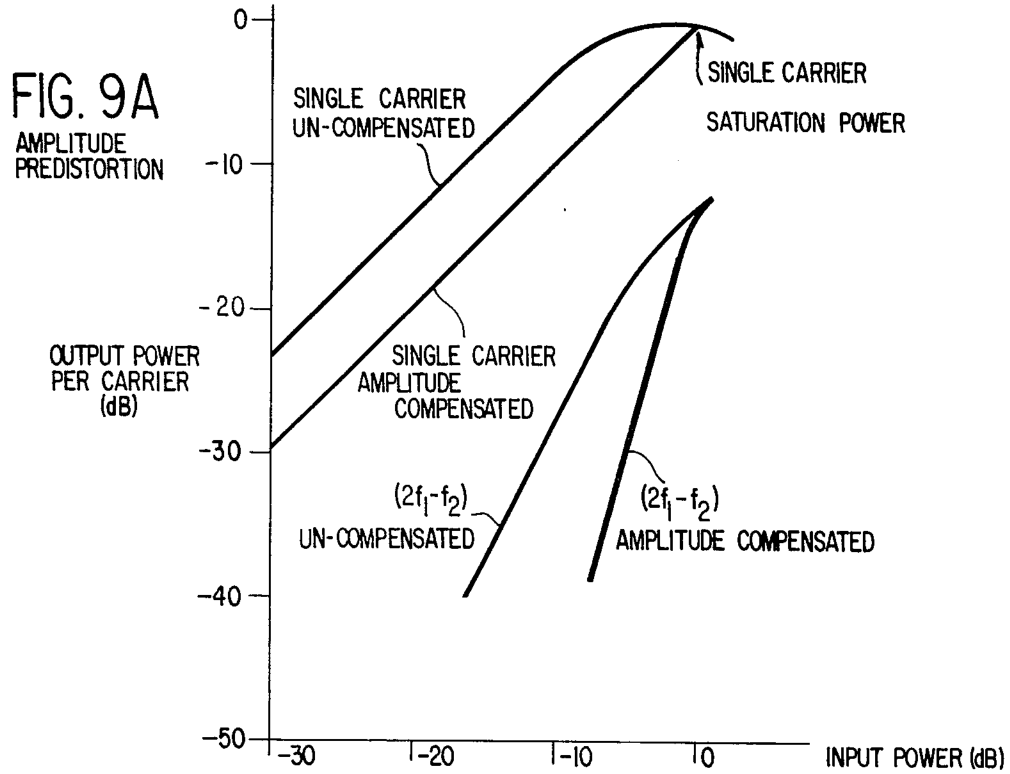
FIGS. 9A and 9B are graphs of the results obtained with the apparatus of the present invention.

Referring to FIG. 9A there is shown the results obtained with the amplitude predistorter of the present invention. Illustrated therein is a graph of the input/output characteristics of a TWT for a single carrier uncompensated and a single carrier compensated with the amplitude predistorter of the present invention. Also shown is a curve of one intermodulation product ($2f_1 - f_2$) uncompensated when a second carrier simultaneously travels through the TWT and a curve of the intermodulation product ($2f_1 - f_2$) amplitude compensated when the amplitude predistorter of the present invention is used. This graph clearly illustrates the linearization, through saturation, of the amplitude characteristic of the TWT. Also illustrated is the reduction in power of an intermodulation product when the carriers are amplitude predistorted with the device of the present invention.

Figure 9B:
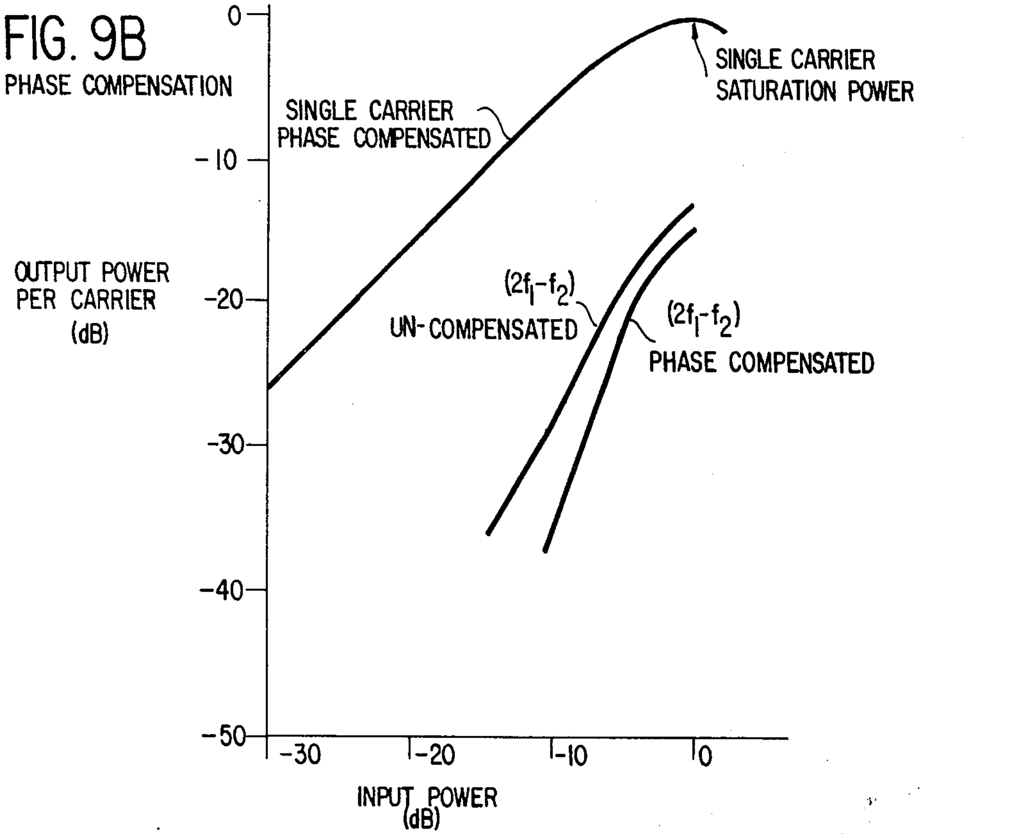

Referring to FIG. 9B there is also shown the results obtained with the phase compensator of the present invention. The upper curve illustrates the input/output amplitude characteristics of a TWT for a single carrier phase compensated. No linearization of this curve is shown since this graph represents only phase compensation. However, also shown is a curve of one intermodulation product ($2f_1 - f_2$) uncompensated when a second carrier simultaneously travels through the TWT and a curve of the intermodulation product ($2f_1 - f_2$) phase compensated when the phase compensator of the present invention is used. A comparison of these latter curves discloses the reduction in power of the intermodulation products when the phase compensator of the present invention is used.

What is claimed is:

1. Apparatus for linearly amplifying signals, comprising:
- a. an amplifier, having a non-linear amplitude characteristic; and
- b. means, anteriorly connected to said amplifier and having an amplitude characteristic inverse to said amplifier, for predistorting the amplitude of an input signal wherein said means for predistorting includes a feedforward control means for controlling said inverse characteristic.

2. The apparatus of claim 1 wherein said means for predistorting comprises:
- a. means for generating a first signal substantially linearly proportional to said input signal;
- b. means, responsive to said feedforward control means, for generating a second signal substantially exponentially proportional to said input signal; and
- c. means, connected to said first and second signal generating means, for combining said first and second signals.

3. The apparatus of claim 1 wherein said means for predistorting comprises:
- a. means for dividing said input signal into first and second signals;
- b. means, connected to said dividing means, for substantially linearly attenuating said first signal;
- c. means, responsive to said feedforward control means, for substantially exponentially attenuating said second signal; and
- d. means, connected to said first and second signal attenuating means, for adding said linearly attenuated and said exponentially attenuated signals.

4. The apparatus of claim 3 wherein said means for exponentially attenuating comprises a diode attenuator having a control input terminal and wherein said means for controlling comprises means for generating a control current proportional to the amplitude of said input signal and for feeding said control current to said control input terminal.

5. The apparatus of claim 4 further including:
- a. means, connected to said means for controlling, for passing control current to said diode attenuator up to a predetermined maximum; and
- b. means, connected between said amplifier and said means for predistorting, for passing said added signal to said amplifier up to a predetermined maximum amplitude.

6. The apparatus of claim 1 wherein said amplifier has a differential phase characteristic and including means, anteriorly connected to said amplifier, for compensating for said differential phase characteristic.

7. Apparatus, anteriorly connected to an active device having a non-linear power characteristic, having a power characteristic inverse to that of said active device for effectively linearizing said power characteristic, comprising:
- a. means, responsive to an input signal, for generating a first signal substantially linearly proportional to said input signal;
- b. means, responsive to said input signal, for generating a second signal substantially exponentially proportional to said input signal; and
- c. means for combining said first and second signals.

8. Apparatus, anteriorly connected to an active device having a non-linear power characteristic, having a power characteristic inverse to the power characteristic of said active device, for predistorting an input signal, comprising:

means, responsive to said input signal, for dividing said input signal into first and second signals;

b. means, connected to said dividing means, for substantially linearly attenuating said first signal;

c. means, connected to said dividing means, for substantially exponentially attenuating said second signal; and d. means, connected to said first and second signal attenuating means, for combining said linearly attenuated signal and said exponentially attenuated signal.

9. The apparatus of claim 8 wherein said means for substantially exponentially attenuating comprises:

a. a first diode attenuator, responsive to said second signal and having a control input terminal;

b. feedforward control means, responsive to said input signal, for generating a control current proportional to the power of said input signal; and c. means, connected to said feedforward control means, for applying said control current to said control input terminal.

10. The apparatus of claim 9 wherein said means for generating comprises in series a variable attenuator, a crystal detector and an amplifier.

11. The apparatus of claim 10 wherein said means for substantially linearly attenuating comprises:

a. a second diode attenuator, responsive to said first signal and having a control input terminal; and b. means, connected to said second diode attenuator, for providing a fixed control current to the control input terminal of said second diode attenuator.

12. The apparatus of claim 11 wherein said means for dividing and said means for combining are hybrid circuits.

13. The apparatus of claim 12 further including:

a. a clamp, connected to said means for generating, for passing control current to said first diode attenuator up to a predetermined maximum; and b. a limiter, connected between said apparatus for predistorting and said active device for passing signals to said active device up to a predetermined maximum amplitude.

14. Apparatus for amplifying signals, comprising:

a. an amplifier, having a differential phase characteristic; and b. means, anteriorly connected to said amplifier, for phase shifting an input signal to said phase shifting means in dependence upon the amplitude of said input signal and for applying said phase shifted signal to said amplifier wherein the phase of the output of a signal from said amplifier, is in the same phase relationship to the phase of said input signal irrespective of the amplitude of said input signal.

15. The apparatus of claim 14 wherein said means for phase shifting comprises:

a. first means for dividing said input signal into first and second signals;

b. means, connected to said first dividing means, for differentially varying the amplitude of said first signal with respect to the amplitude of said second signal in dependence upon the amplitude of said input signal; and c. first means, connected to said differentially varying means, for combining said differentially varied signals to obtain a resultant signal having a phase shift with respect to said input signal which will compensate for the phase shift of said resultant signal through said amplifier.

16. The apparatus of claim 15 wherein said means for differentially varying comprises:

a. means, connected to said first dividing means, for substantially linearly attenuating said first signal;

b. second means, connected to said first dividing means, for dividing said second signal into third and fourth signals having a phase difference between them;

c. means, connected to said second dividing means, for substantially exponentially attenuating said third signal; and d. means, connected to said second dividing means, for substantially linearly attenuating said fourth signal; and e. second means, connected to said third and fourth signal attenuating means, for combining said third and fourth signals into a fifth signal having a phase difference with respect to said first signal.

17. The apparatus of claim 16 wherein said means for substantially exponentially attenuating comprises:

a. a first diode attenuator, having a control input terminal;

b. means, responsive to said input signal, for generating a control current proportional to the amplitude of said input signal; and c. means, connected to said control current generating means, for applying said control current to said control input terminal.

18. The apparatus of claim 17 wherein said first means for combining comprises means for adding said first signal and said fifth signal to provide said resultant signal.

19. The apparatus of claim 14 wherein said amplifier has a non-linear amplitude characteristic and means, anteriorly connected to said amplifier, for effectively linearizing said non-linear amplitude characteristic.

20. Apparatus, anteriorly connected to an active device having a differential phase characteristic, comprising:

a. means for dividing an input signal into first and second signals;

b. means, connected to said dividing means, for differentially varying the power of said first signal with respect to the power of said second signal in dependence upon the power of said input signal; and c. means, connected to said differential varying means, for combining said differentially varied signals to obtain a resultant signal having a phase shift with respect to said input signal which will compensate for the phase shift of said resultant signal through said amplifier.

21. Apparatus, anteriorly connected to an active device having a differential phase characteristic, comprising:

a. first means for dividing an input signal into first and second signals;

b. means, connected to said first dividing means, for substantially linearly attenuating said first signal;

c. second means, connected to said first dividing means, for dividing said second signal into third and fourth signals having a phase difference between them;

d. means, connected to said second dividing means, for substantially exponentially attenuating said third signal;

e. means, connected to said second dividing means, for substantially linearly attenuating said fourth signal;

f. means, connected to said first dividing means, for phase shifting said first signal −270° with respect to said input signal;

g. means, connected to said third and fourth signal attenuating means, for subtracting said third signal from said fourth signal to produce a fifth signal having a phase shift of −180° with respect to said input signal; and h. means, connected to said first signal linearly attenuating and phase shifting means and said subtracting means, for adding said linearly attenuated and phase shifted first signal and said fifth signal to produce a resultant signal having a phase shift with respect to said input which will compensate for the phase shift of said resultant signal through said active device.

22. The apparatus of claim 21 wherein said means for substantially exponentially attenuating comprises:

a. a first diode attenuator having a control input terminal;

b. means, responsive to said input signal, for generating a control current proportional to the power of said input signal; and c. means, connected to said control current generating means, for applying said control current to said control input terminal.

23. The apparatus of claim 22 wherein said means for generating comprises, in series, a variable attenuator, a crystal detector and an amplifier.

24. The apparatus of claim 23 wherein said means for substantially linearly attenuating comprises:

a. a second diode attenuator, having a control input terminal; and b. means for providing a fixed control current to the control input terminal of said second diode attenuator.

25. The apparatus of claim 24 wherein said means for dividing, said means for subtracting, said means for phase shifting, and said means for adding are hybrid circuits.

26. In combination:

a. an amplifier, having a non-linear amplitude characteristic and a differential phase characteristic;

b. means, anteriorly connected to said amplifier and having an amplitude characteristic inverse to said amplifier, for predistorting the amplitude of an input signal; and c. means, anteriorly connected to said amplifier, for phase shifting an input signal in dependence upon the amplitude of said input signal and for applying said phase shifted signal to said amplifier wherein the phase of the output of a signal from said amplifier is in the same phase relationship to the phase of the input signal irrespective of the amplitude of said input signal.

27. The combination of claim 26 wherein said means for predistorting comprises:

a. first means for dividing an input signal into first and second signals;

b. means, connected to said first dividing means, for substantially linearly attenuating said first signal;

c. means, connected to said first dividing means, for substantially exponentially attenuating said second signal; and d. means, connected to said first and second signal attenuating means, for adding said linearly and exponentially attenuated signals.

28. The combination of claim 27 wherein said means for phase shifting comprises:

a. first means for dividing an input signal into first and second signals;

b. means, connected to said first dividing means, for substantially linearly attenuating said first signal;

c. second means connected to said first dividing means for dividing said second signal into third and fourth signals having a phase difference between them;

d. means, connected to said second dividing means, for substantially exponentially attenuating said third signal;

e. means, connected to said second dividing means, for substantially linearly attenuating said fourth signal;

f. means, connected to said first dividing means, for phase shifting said first signal $-270°$ with respect to said input signal;

g. means, connected to said third and fourth signal attenuating means, for subtracting said third signal from said fourth signal to produce a fifth signal having a phase shift of $-180°$ with respect to said input signal; and h. means, connected to said first signal linearly attenuating and phase shifting means and said subtracting means, for adding said linearly attenuated and phase shifted first signal and said fifth signal to produce a resultant signal having a phase shift with respect to said input signal which will compensate for the phase shift of said resultant signal through said amplifier.

29. The combination of claim 28 wherein said means for substantially exponentially attenuating comprises:

a. a first diode attenuator, having a control input terminal;

b. means, responsive to said input signal, for generating a control current proportional to the amplitude of said input signal; and c. means, connected to said control current generating means for applying said control current to said control input terminal.

30. The combination of claim 29 wherein said means for generating comprises, in series, a variable attenuator, a crystal detector and an amplifier.

31. The combination of claim 30 wherein said means for substantially linearly attenuating comprises:

a. a second diode attenuator, having a control input terminal; and b. means, connected to said second diode attenuator, for providing a fixed control current to the control input terminal of said second diode attenuator.

32. The combination of claim 31 wherein said means for dividing, said means for phase shifting, said means for subtracting and said means for adding are hybrid circuits.

* * * * *